Patented Feb. 10, 1953

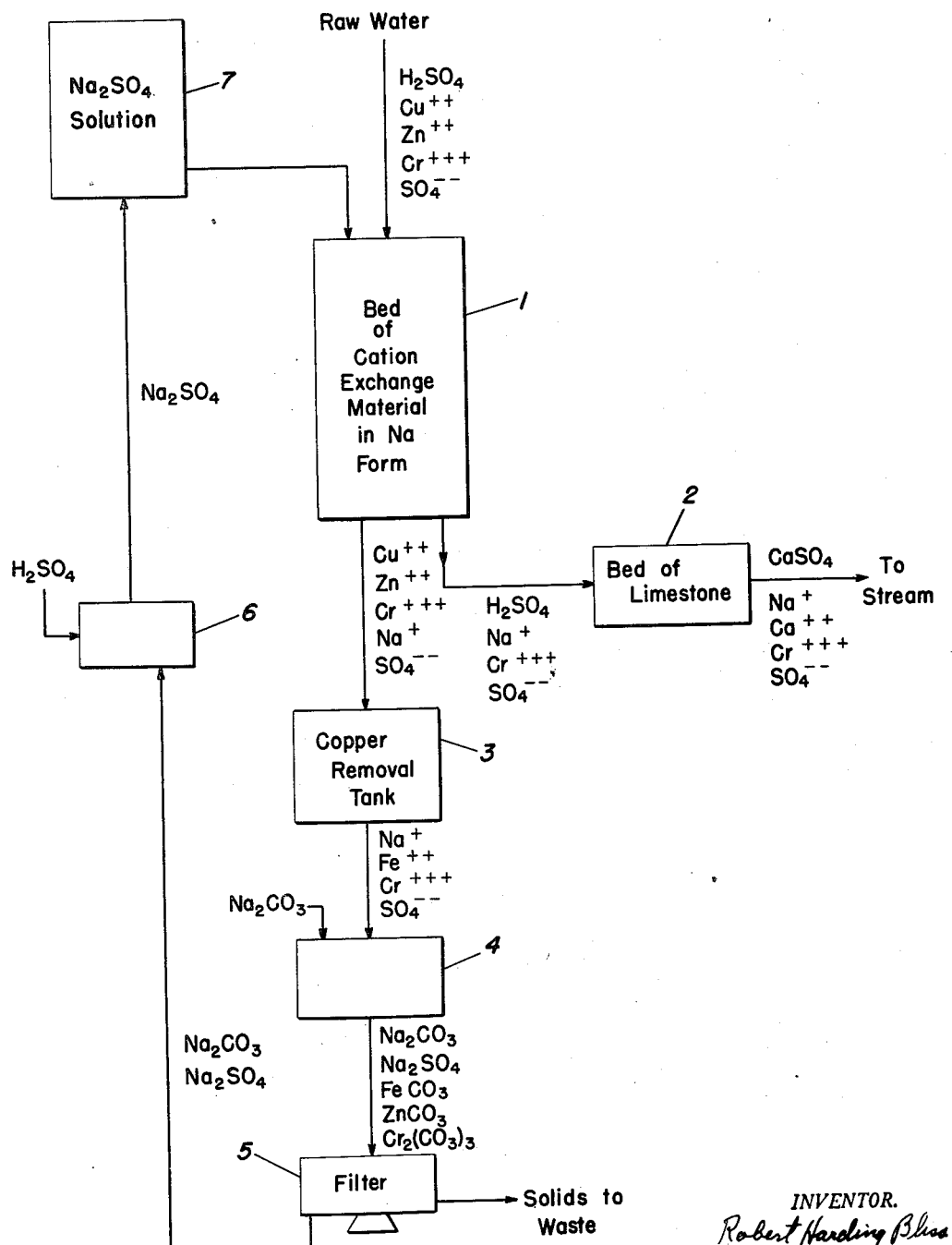

2,628,165

UNITED STATES PATENT OFFICE 2,628,165

PROCESS OF PREVENTING POLLUTION OF STREAMS

Robert Harding Bliss, Mount Carmel, Conn., assignor to Rohm & Haas Company, Philadelphia, Pa., a corporation of Delaware Application March 9, 1950, Serial No. 148,659

4 Claims. (Cl. 75—108)

This invention relates to a process of recovering industrial wastes. It relates to a process of recovering metals from the wash-waters in brass mills.

At various stages in the manufacture of brass it is customary to anneal the brass. Oxidation takes place during the annealing operation and as a result the annealed brass becomes coated with an undesirable film which must be removed by "pickling." In the pickling operation the brass is dipped in dilute sulfuric acid or, in the case of the "bright dip" operation, in a solution of sulfuric acid and a soluble dichromate salt such as sodium dichromate. The oxidized layer is removed in the pickling operation and huge quantities of metals, chiefly copper and zinc, become dissolved in the pickling liquors. These pickling liquors which are relatively concentrated because they contain large quantities of dissolved metal in the form of salts are in some cases presently treated so as to recover the metals therefrom. After the brass has been pickled, it is washed free of the pickling liquor with water. The resultant wash-waters consequently contain the same ingredients as the pickling liquors but in much lower concentrations. In fact, the concentration of dissolved metals in the wash-waters is so low that heretofore recovery of the metals has not been commercially feasible and the wash-waters have been considered as industrial wastes—to be disposed of as easily and cheaply as possible. This, despite the fact that it has been shown that a single brass company discards as much as 200,000 pounds of copper and even more zinc in its wash-waters in a single year together with more than a million pounds of sulfuric acid and large quantities of chromium.

Usually the wash-waters are pumped into a natural stream such as a river. Marine life—animal and vegetable—is destroyed and as a result the streams are polluted. With the current wave of anti-pollution laws it becomes increasingly necessary to avoid the dumping of wastes, especially the toxic, brass mill wastes, into public streams. This imposes upon the manufacturer the added cost of disposing of wastes.

An object of this invention is to provide a means of disposing of brass mill wastes. More than that, an object is to avoid waste by recovering from the wash-waters at least some of the dissolved metals which can be re-used. A further object is to recover enough of the metals in such a way as to at least cover the cost of the recovery operation. A still further object is to avoid stream-pollution by converting the brass mill wastes into usable metals and into solid wastes which can be easily handled and can be dumped on waste land or can be used as "fill."

This process is most easily understood from a consideration of the attached flow-sheet which illustrates a preferred way of carrying out this invention. Modifications in the process are discussed below. Raw brass mill wash-waters from the brass-pickling operation contain sulfuric acid as well as copper, zinc, and chromium in the form of sulfates together with other ions such as those of iron. These wash-waters are passed through a bed or layer 1 of a cation-exchange resin which contains sulfonate groups and is in the sodium form. At this point the sodium ion of the ion-exchange resin is exchanged for the ions of the heavier metals, copper, zinc, and chromium. Ordinarily only about half of the chromium ions are adsorbed but the ions of the other metals are essentially completely removed from solution. The effluent from the bed of ion-exchange resin contains sulfuric acid, sodium sulfate, and chromium sulfate. This is brought in contact at 2 with lime or limestone and the effluent is thereby neutralized. After this step of neutralization the solution contains calcium sulfate, sodium sulfate, and a small amount of chromium sulfate. Such a solution has a very low toxicity to animal or vegetable life and can be safely and conveniently pumped into a stream with no danger or prospect of pollution. After the bed of ion-exchange resin 1 has become exhausted; that is, after it has adsorbed its full capacity of the heavy metal ions, it is regenerated and the metals adsorbed thereon are removed and recovered or otherwise disposed of. For this purpose an aqueous solution of sodium sulfate is run from storage tank 7 into the bed of exhausted ion-exchange resin 1. Here the sodium of the sodium sulfate replaces the heavy metal ions and the effluent from 1 consequently contains copper, zinc, and chromium in the form of sulfates together with any sodium sulfate which was in excess of the amount required to replace the heavy metal ions on the bed of resin. This effluent, it will be noted, contains the same heavy metal ions as are present in the original waste wash-waters under treatment. But while the ions are the same, they are present in far greater concentration and consequently can be handled efficiently and economically. This concentrated effluent is then run into container 3 where the copper is removed. This is done by electrolysis of the solution or by electro-displacement by merely putting scrap iron or scrap brass in the effluent. Methods such as are used in the recovery of metals from the concentrated pickling liquors are operable here. In any case, copper is plated out or deposited and is removed for re-use. The remaining solution, free of copper, is then removed to reactor 4 where it is treated with sodium carbonate. Zinc may also be removed by electro-deposition before precipitation, if desired. The heavy metals, zinc (unless removed), chromium, and iron, are here precipitated as carbonates and are filtered off by suitable and conventional filtering equipment 5. Thus, there is obtained a mixture of solid, heavy metal carbonates which can be re-worked by customary methods or merely disposed of as solid waste on waste-land or as fill. At the same time that the heavy metals are converted from sulfates to insoluble carbonates in reactor 5, the sodium carbonate is converted by metathesis into sodium sulfate. This solution of sodium sulfate and excess sodium carbonate is then brought to a pH of about 4–7 with sulfuric acid at point 6 and the resultant solution of sodium sulfate is circulated to tank 7 where it is available for subsequent regeneration of bed 1. Thus in reactor 4 sodium sulfate, which is the regenerant for the bed of ion-exchange resin 1, is itself regenerated.

In the process as described above, essentially only lime or limestone, sodium carbonate, scrap iron or brass or electricity are consumed. In exchange for the cost of these cheap items, all of the copper is recovered as well as the zinc if desired. Furthermore, truly enormous volumes of toxic, liquid wastes are converted into essentially non-toxic liquids and relatively small volumes of solid wastes, both of which are easily disposed of. The pollution of streams is eliminated, the value of the recovered copper at least pays for the process and is available for re-use instead of being poured away in the public waters.

This process is not the only one by which wash-waters can be freed of toxic but valuable metal ions. It is theoretically possible, for example, to treat all of the wash-waters with lime and thereby to precipitate the metals. But, practically, this process is not commercially attractive due to the enormous volume of wash-water which is involved and the very dilute concentrations of the metal ions in the wash-water. Not only is the capital investment for equipment prohibitive and the size of the necessary equipment unwieldly, but the copper and/or zinc are not economically recoverable thereby and are merely disposed of as solid waste. Thus, in such a process, as contrasted with that of the instant invention, materials are constantly consumed and nothing of value is recovered.

While the above is a description of the preferred method of carrying out the process of this invention, modifications in the method can be made without departing from the spirit of this invention which in its simplest elements is one of preventing the pollution of public waters by removing and recovering from the wash-waters of brass mills the dissolved metals which cause pollution.

The cation-exchange materials which are employed are those known as sulfonic ion-exchange resins or carbonaceous zeolites. The former are insoluble, infusible, sulfonated, phenolformaldehyde resins. They are commercially available and are prepared according to the teachings of such patents as U. S. 2,191,853, 2,228,159, 2,228,- 160, 2,319,351, and 2,204,339. Without exception these resins are insoluble and infusible and contain sulfonate groups. When they are in the hydrogen form, they are in reality insoluble but strong sulfonic acids which are capable of neutralization. Actually in the process of this invention the cation-exchange resins are used in the form of salts; e. g., as sodium sulfonates. Another type of synthetic, organic, insoluble, infusible, sulfonated cation-exchange resin which is eminently suitable for use in this process is the sulfonated, cross-linked copolymer of styrene and divinylbenzene such as is made by the process of U. S. Patent No. 2,366,007. The carbonaceous zeolites likewise are insoluble and infusible and contain sulfonate groups. They are ordinarily made by the sulfonation of such carbonaceous materials as coke, coal, and wood as shown by U. S. Patents Nos. 2,191,060 and 2,382,334. Like the sulfonated, ion-exchange resins, the carbonaceous zeolites are employed in this process in the form of salts. The carbonaceous zeolites are less desirable than the synthetic resins in this invention because of their lower capacity. All of the above cation-exchange materials are well-known and are classified as insoluble, infusible, synthetic, organic cation-exchangers containing sulfonate groups or, more simply, as cation-exchange materials of the sulfonic acid type.

It is much preferred that the ion-exchange resin be in the form of the sodium salt and that the exhausted resin after exchange of sodium for the heavy metals be regenerated with sodium sulfate. However, the exhausted resin can also be regenerated with a solution of sodium chloride in which case hydrochloric acid is used at point 6 to adjust the pH of the filtrate from the filtration of the precipitate of heavy metals as shown at point 5 on the attached flow-sheet. The use of sodium sulfate rather than sodium chloride is preferred for the reason that copper cannot be electroplated from a solution containing chloride ions (at point 3) as conveniently as from a sulfate solution, although the chloride ion is not objectionable when the copper is recovered by electro-replacement on iron or brass.

Alternatively, the ion-exchange resin operates well in the form of its magnesium salt. When this practice is followed, the resin is regenerated with magnesium sulfate or magnesium chloride and the pH of the solution of the magnesium salt is adjusted to 4–7 at point 6 as shown on the flow-sheet with sulfuric or hydrochloric acids respectively. Also the heavy metals are precipitated as oxides with magnesium oxide, hydroxide, or carbonate at point 4. While this alternative method of using the ion-exchange resin in the magnesium form has certain advantages in cost of operation over the process involving the ion-exchange material in the sodium form, the rate of exchange of the heavy metals for magnesium is slower and, hence, a larger bed of resin is required with its higher capital investment.

The ion-exchange resin can likewise be operated in the form of its ammonium salt. In such a case the oxides of zinc, iron, and chromium are precipitated at point 4 with ammonia, and the pH of the filtrate is adjusted to 4–7 at point 6 with either hydrochloric acid or sulfuric acid depending upon whether ammonium chloride or ammonium sulfate is employed as the regenerant for the exhausted bed of ion-exchange material.

A less efficient process is that in which the original ion-exchange material is in the form of the calcium salt. This modification employs lime, which is cheap, in the precipitation step at point 4, but the rate of exchange of calcium for the metals in the original wash-waters is much like that of magnesium and, hence, larger installations are required. In addition, the formation of relatively insoluble calcium sulfate is always a troublesome factor, especially when it is formed in the bed of ion-exchange material. This can be prevented by providing automatic dilution of the raw water to keep below the concentration of calcium sulfate precipitation. In the event that the ion-exchange material is employed in the calcium form in order to take advantage of the use of lime as a precipitant at point 4, then calcium chloride is used as the regenerant and the solution of calcium salt is neutralized with hydrochloric acid at point 6.

The choice as to whether the regenerating salt shall be a sulfate or a chloride should be based on whether the copper is to be electro-deposited by passage of an electric current or electro-displaced by a metal such as scrap iron, since electrolysis is not convenient in the presence of the chloride ion, due to the liberation of chlorine. On the other hand, copper is plated out readily by either method in the presence of the sulfate ion and in the case of electrolysis sulfuric acid is prepared simultaneously which can be used for example at point 6.

At point 4 as shown in the flow-sheet the heavy metals are precipitated as the oxides, hydroxides, or carbonates. For this purpose sodium hydroxide or carbonate, ammonia, lime, slaked lime, magnesium hydroxide, or magnesium carbonate is used depending upon the metal which forms the original salt with the ion-exchange material. As indicated above, the step of precipitating the iron, zinc, and chromium is accompanied by a regeneration of salt which in turn is used to regenerate the bed of ion-exchange material. Thus, in this novel step the regenerant is itself regenerated.

Whereas in previously known methods of treating wash-waters from brass mills, in order to prevent the pollution of streams, the metals including copper were obtained in the form of worthless oxides, this process yields metallic copper which is readily usable. Furthermore, depending upon the particular way in which the copper is plated out from its concentrated solutions, it can be made to produce copper in a form suitable for use in powder metallurgy. Copper in this form has a particularly high monetary value. The copper is plated out by well-known methods including electrolysis and electro-displacement. This latter method is attractive because it calls for nothing more than the use of scrap iron which, when put into the concentrated solution obtained by regenerating the bed of ion-exchange material, displaces the copper and itself goes into solution. Scrap brass can also be used for the same purpose and zinc goes into solution.

In order to employ this process on a continuous basis, it is necessary to use two or more beds of ion-exchange materials so that one bed can adsorb the ions from the wash-waters while another bed, previously exhausted by the adsorption of such ions, is being regenerated.

The following example serves to further illustrate the preferred method of carrying out this invention and shows how large volumes of stream-polluting wash-waters are rendered non-toxic and how copper is recovered and how the other dissolved metals are removed from the wash-waters as solids.

*Example*

Five and one-half million parts of raw, brass-mill wash-water, containing 76 parts per million of copper ions, 81 parts per million of zinc ions, and 42 parts per million of trivalent chromium ions as well as 350 parts per million of sulfuric acid was filtered through a bed of sand and then passed through a bed containing 10,000 parts of a synthetic, organic, sulfonated, cross-linked styrene-divinylbenzene resin in the sodium form, prepared by the process of U. S. Patent No. 2,366,007.

The effluent contained 350 parts per million of sulfuric acid, 19 parts per million of trivalent chromium ions, and 143 parts per million of sodium ions. It was substantially free of copper and zinc ions. This solution was passed rapidly through a bed of crushed limestone and the effluent from the limestone bed was passed to a stream. This effluent contains approximately 19 parts per million of trivalent chromium ion, 143 parts per million of sodium ion, and 143 parts per million of calcium ion, the anions being sulfate. Such a solution is non-toxic and does not give rise to pollution.

The bed of ion-exchange resin was then regenerated by passing therethrough 60,000 parts of a 10% aqueous solution of sodium sulfate. It was then rinsed with water and the rinse-water was passed to the stream since it was merely a very dilute solution of sodium sulfate. The bed of ion-exchange resin was then ready for re-use. The effluent from the step of regenerating the ion-exchange resin contained approximately 6.2% sodium sulfate, 0.7% copper, 0.76% zinc, and 0.21% chromium. The anions were essentially all sulfate. This solution was then treated with 500 parts of scrap iron and allowed to stand overnight during which time the copper precipitated as a finely divided powder. The mixture was filtered and the copper and bits of iron thus removed. The filtrate, containing iron, zinc, chromium, and sodium as sulfates, was then treated with sodium carbonate in slight excess and the precipitate of the heavy metals was filtered off and washed with water. The filter cake consisting of the oxides and carbonates of iron, zinc, and chromium was discarded as solid waste. The filtrate was adjusted to a pH of 5 and to a 10% concentration of sodium sulfate with dilute sulfuric acid and was ready for use in regenerating another exhausted bed of ion-exchange resin.

I claim:

1. A process for treating the wash-waters from brass mills which comprises passing the raw wash-waters from the brass-pickling operation, which waters contain sulfuric acid together with the sulfates of copper, zinc, and chromium, through a bed of an insoluble, infusible, organic, cation-exchange material which contains sulfonate groups and is in the form of a salt of a member of the class consisting of sodium, calcium, magnesium, and ammonia, adsorbing on said bed of cation-exchange material the ions of copper, zinc, and at least some of the chromium ions, contacting and neutralizing the effluent from the bed of ion-exchange material with a compound from the class consisting of lime and limestone, passing the resultant aqueous solution to waste, regenerating the bed of cation-exchange material by passing therethrough an aqueous solution of a water-soluble salt whose cation is the same as that originally combined with said cation-exchange material and whose anion is a member of the class consisting of sulfate and chloride ions, collecting the effluent from the bed of regenerated cation-exchange material, which effluent contains the ions of copper, zinc, and chromium, removing copper by depositing it from said effluent, treating the resultant solution with a compound whose cation is the same as that originally combined with said cation-exchange material which compound is a member of the class consisting of sodium carbonate, sodium hydroxide, magnesium oxide, magnesium hydroxide, magnesium carbonate, lime and ammonium hydroxide, removing the resultant precipitate and adjusting the pH of the resultant aqueous solution to 4 to 7 with a mineral acid whose anion is the same as the anion of the salt employed to regenerate said bed of cation-exchange material.

2. A process for treating the wash-waters from brass mills which comprises passing the raw wash-waters from the brass-pickling operation, which waters contain sulfuric acid together with the sulfates of copper, zinc, and chromium, through a bed of an insoluble, infusible, organic, cation-exchange material which contains sulfonate groups and is in the form of the sodium salt, adsorbing on said bed of cation-exchange material the ions of copper, zinc, and at least some of the chromium ions, contacting and neutralizing the effluent from the bed of ion-exchange material by passing it rapidly through a bed of limestone, passing the resultant effluent to waste, regenerating the bed of cation-exchange material by passing therethrough an aqueous solution of sodium sulfate, collecting the effluent from the bed of regenerated cation-exchange material, which effluent contains the ions of sodium, copper, zinc, and chromium, removing copper by depositing it from said effluent, treating the resultant solution with sodium carbonate, removing the resultant precipitate and adjusting the pH of the resultant aqueous solution to 4 to 7 with sulfuric acid.

3. A process for treating the wash-waters from brass mills which comprises passing the raw wash-waters from the brass-pickling operation, which waters contain sulfuric acid together with the sulfates of copper, zinc, and chromium, through a bed of an insoluble, infusible, organic, cation-exchange material which contains sulfonate groups and is in the form of the magnesium salt, adsorbing on said bed of cation-exchange material the ions of copper, zinc, and at least some of the chromium ions, contacting and neutralizing the effluent from the bed of ion-exchange material by passing it rapidly through a bed of limestone, passing the resultant effluent to waste, regenerating the bed of cation-exchange material by passing therethrough an aqueous solution of magnesium chloride, collecting the effluent from the bed of regenerated cation-exchange material, which effluent contains the ions of magnesium, copper, zinc, and chromium, removing copper by depositing it from said effluent, treating the resultant solution with magnesium hydroxide, removing the resultant precipitate and adjusting the pH of the resultant aqueous solution to 4 to 7 with hydrochloric acid.

4. A process for treating the wash-waters from brass mills which comprises passing the raw wash-waters from the brass-pickling operation, which waters contain sulfuric acid together with the sulfates of copper, zinc, and chromium, through a bed of an insoluble, infusible, organic, cation-exchange material which contains sulfonate groups and is in the form of the calcium salt, adsorbing on said bed of cation-exchange material the ions of copper, zinc, and at least some of the chromium ions, contacting and neutralizing the effluent from the bed of ion-exchange material by passing it rapidly through a bed of limestone, passing the resultant effluent to waste, regenerating the bed of cation-exchange material by passing therethrough an aqueous solution of calcium chloride, collecting the effluent from the bed of regenerated cation-exchange material, which effluent contains the ions of calcium, copper, zinc, and chromium, removing copper by depositing it from said effluent, treating the resultant solution with calcium hydroxide, removing the resultant precipitate and adjusting the pH of the resultant aqueous solution to 4 to 7 with hydrochloric acid.

ROBERT HARDING BLISS.

REFERENCES CITED

The following references are of record in the file of this patent:

UNITED STATES PATENTS

| Number | Name | Date |
| --- | --- | --- |
| 2,206,007 | Liebknecht | June 25, 1940 |
| 2,397,575 | Tiger et al. | Apr. 2, 1946 |

OTHER REFERENCES

"Ion Exchange" edited by Nachod, published by Academic Press Inc., New York, 1949, pages 236–242.